United States Patent [19]
Emley, Jr.

[11] Patent Number: 5,203,604
[45] Date of Patent: Apr. 20, 1993

[54] CONVERTIBLE AUTOMOBILE REMOVABLE ARMREST

[76] Inventor: Joseph R. Emley, Jr., 31520 Egan, South Laguna, Calif. 92677

[21] Appl. No.: 879,970

[22] Filed: May 6, 1992

[51] Int. Cl.$^5$ .............................................. B60J 9/00
[52] U.S. Cl. ..................................... 296/153; 297/413
[58] Field of Search ................ 296/153; 297/412, 413

[56] References Cited

U.S. PATENT DOCUMENTS

| | | | |
|---|---|---|---|
| 1,374,907 | 4/1921 | Cofrode | 297/413 X |
| 1,650,385 | 11/1927 | Payton | 296/153 |
| 1,873,190 | 8/1932 | Doller | 296/153 |
| 2,601,052 | 6/1952 | Ortleb | 296/153 |
| 2,617,679 | 11/1952 | Maguire . | |
| 2,738,220 | 3/1956 | Simmons | 296/153 |
| 2,838,340 | 6/1958 | Johnson . | |
| 2,948,565 | 8/1960 | Johnson | 296/153 |
| 3,310,339 | 3/1967 | Stanley | 296/153 |
| 4,331,360 | 5/1982 | Roudybush et al. . | |
| 4,982,921 | 1/1991 | Sanders . | |

FOREIGN PATENT DOCUMENTS 795151 5/1958 United Kingdom .

Primary Examiner—Russell D. Stormer
Assistant Examiner—Gary C. Hoge
Attorney, Agent, or Firm—Knobbe, Martens, Olson & Bear

[57] ABSTRACT

A removable armrest provides a comfortable and convenient armrest for automobiles with removable tops and windows. The armrest conforms to the upper edge of the door. Engaging pins which correspond to engaging holes along the upper edge of the door when the windows are removed extend from the bottom of the armrest. The engaging pins slide into the engaging holes and securely hold the armrest in place when it is removably installed along the upper edge of the door.

22 Claims, 2 Drawing Sheets

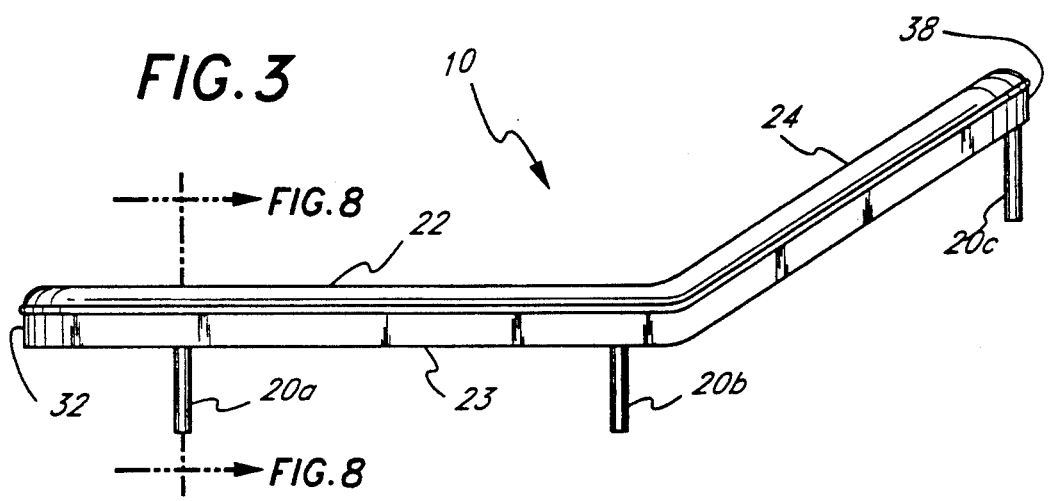
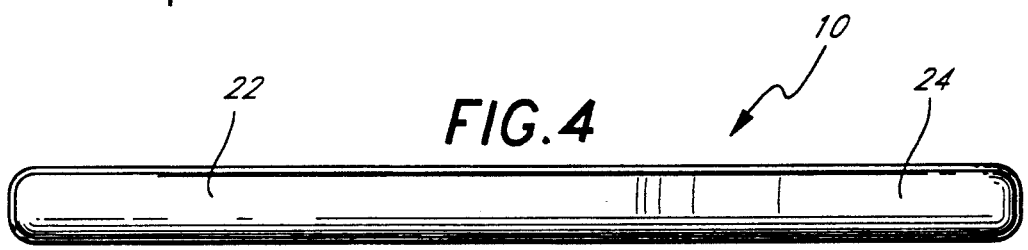
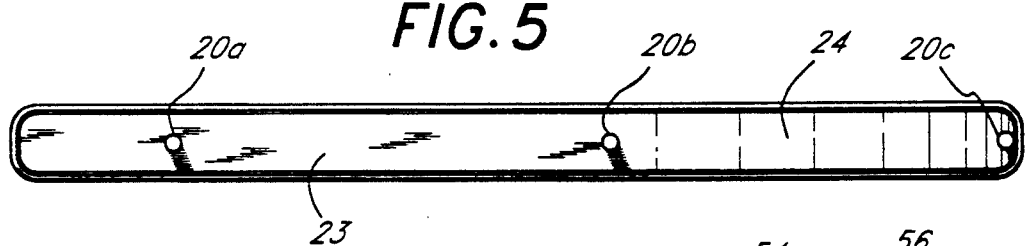
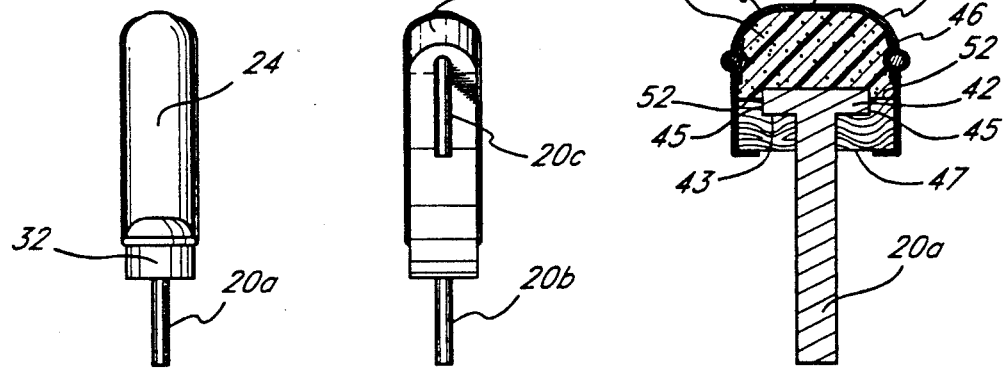

CONVERTIBLE AUTOMOBILE REMOVABLE ARMREST

BACKGROUND OF THE INVENTION

1. Field of the Invention

The present invention relates to the field of removable armrests for convenient mounting on the upper edge of a car door of a removable-top automobile.

2. Description of the Related Art

Removing the top of a convertible automobile, such as a Jeep Wrangler ®, typically exposes a track or other pieces of metal along the upper edge of the car doors. Often times, the exposed track is uneven and uncomfortable to rest one's arm upon. In addition, the metal often becomes very hot due to constant exposure to the sun, and can burn a person's skin.

Providing an armrest for use along the upper edge of the door frame of an automobile to provide comfort for the driver's arm has been disclosed in several patents. For instance, U.S. Pat. No. 2,948,565, issued to Johnson, discloses an armrest that comprises a flat metal base topped with foam padding and a protective covering. Metal U-shaped clips that extend from the base of the armrest are used to attach the armrest to the glass window of the automobile when it is stored in the window slot in the door frame.

Both U.S. Pat. No. 2,838,340, issued to Johnson, and U.S. Pat. No. 1,873,190, issued to Doiier, disclose similar armrests that have flat bases made of various materials and covered with a layer of padding and a covering. These patents also disclose the use of U-shaped clips to secure the armrest in place by attaching the clips on the window of the automobile.

U.S. Pat. No. 1,650,385, issued to Payton discloses an armrest which has a padded cushion on a metal frame which attaches to the door frame of the automobile. Payton affixes the armrest to the door frame using various connective means designed to attach the armrest to the window slot without interfering with the stored window.

Generally, the patents listed above disclose armrests that are adapted to fit along the upper edge of the door of an automobile, whether convertible or not, that has a window and a window slot in the door frame. Some automobiles with removable tops do not have a conventional window slot in the door frame. For example, the removable-top Jeep Wrangler ® does not have a window slot in its door panel. Rather, the windows are removable. Removing the top exposes a track on the door panel. The conventional armrests are not configured for use along the upper edge of the door frame of removable-top automobiles, such as the Jeep Wrangler ®, which have no window or window slot.

SUMMARY OF THE INVENTION

Many vehicles such as the Jeep Wrangler ® have a removable top which is positioned on the vehicle by a track along the upper edge of the body of the vehicle. These vehicles often utilize removable windows as well. The track on the door frame has three engaging holes located in the track. The engaging holes are used to keep the windows in place during normal use. The exposure of the track when the top and windows are removed results in an irregular surface which is uncomfortable as an armrest for the driver and/or passenger. The extreme temperatures which are often associated with the exposed track intensify the discomfort.

The present invention comprises a padded armrest adapted for use with removable-top automobiles, particularly those removable-top Jeep Wrangler ® automobile. The armrest of the present invention is used to provide a comfortable cushion for the arm of the driver and/or passenger when the top is removed from the automobile. In addition the armrest provides protection to the arm from the potentially extreme temperatures of the exposed track. Further, the armrest of the present invention provides a smooth armrest surface instead of the typical irregular track along the upper edge of the door.

One embodiment of the armrest of the present invention involves an armrest specifically configured for use along the upper edge of the doors of a Jeep Wrangler ®. In this embodiment, the present invention comprises a substantially rigid frame covered with a layer of foam padding and a suitable covering. In one embodiment, the substantially rigid frame comprises a substantially rigid plate (e.g., metal or the like) and a resilient base member (e.g., wood, plastic, or other materials with similar characteristics). In the present embodiment, the armrest also has three substantially rigid rods attached to and extending from the plate. The rods are positioned along the armrest to correspond with the engaging holes that are located along the track of the upper edge of the door of a Jeep Wrangler ®. The base member is positioned below the plate. Advantageously, the vinyl covering attaches to this base member. The base member also provides height to the armrest to raise an upper surface of the armrest above the track along the upper edge of the door. The padding provides a comfortable cushion as opposed to the hard track with its uneven surfaces.

The armrest is shaped substantially to conform with the shape of the upper edge of the door. The armrest itself has two main portions, the first portion is substantially horizontal to correspond to the horizontal portion of the upper edge door and the second portion is inclined to conform to the inclined portion of the upper edge of the door of a Jeep Wrangler ®. The foam padding and the frame define the thickness of the armrest and the level of cushion that is provided to the driver and/or passenger's arm. In an embodiment where the armrest extends along substantially the entire upper edge of the door, the armrest is comfortable for nearly all drivers and passengers.

One aspect of the present invention involves a removable armrest for use along the upper edge of doors of vehicles having a removable top and having engaging holes along the upper edge of the door. The armrest comprises a first substantially horizontal portion, a second upwardly inclined portion extending from the first horizontal portion, and a plurality of substantially rigid armrest engaging pins extending from a bottom side of the armrest and adapted to fit within the engaging holes along the upper edge of the vehicle door.

Another aspect of the present invention involves a removable armrest for installation along the upper edge of doors of vehicles having a removable window, the vehicle doors having engaging holes along the upper edge of the door. According to this aspect, the armrest has a substantially rigid frame member having a top and a bottom surface. The frame member further has a substantially horizontal portion and a second upwardly inclined portion extending from the first horizontal portion. A base member extends longitudinally along the substantially rigid frame member, wherein the base member conforms to the first substantially horizontal portion and the second upwardly inclined portion. A plurality of substantially rigid armrest engaging pins are mounted to, and extend from, the bottom surface of the rigid frame member, and further extend through the base member. These engaging pins are adapted to fit within the corresponding engaging holes along the upper edge of the vehicle door, and these pins extend from the base member a distance less than or equal to the depth of the engaging holes. A cushion portion extends longitudinally along at least a portion of the top surface of the substantially rigid frame member. Finally, a durable covering encompassing at least a portion of the cushion is attached to the base member.

Still another aspect of the present invention involves a removable armrest for installation along the upper edge of doors of vehicles having a removable window, the vehicle doors having a first substantially horizontal portion and a second inclined portion, and the doors having engaging holes along the upper edge of the door. According to this aspect of the invention, the armrest comprises a first substantially horizontal armrest portion configured to extend along the first horizontal portion of the door, the first armrest portion having a top and a bottom. A second upwardly inclined armrest portion extends from the first horizontal armrest portion and is configured to extend along the second inclined portion of the door. The second armrest portion has a top and a bottom. A cushion member is attached along at least a portion of the top of the first and second armrest portions, and a plurality of substantially cylindrical and substantially rigid armrest engaging pins and fixed to the first substantially horizontal portion. The engaging pins extend from the bottom of the first substantially horizontal armrest portion and are adapted to fit within the engaging holes along the upper edge of the vehicle door. In one embodiment, at least one substantially cylindrical and substantially rigid armrest engaging pin extends from the bottom of the second upwardly inclined armrest portion.

Yet another aspect of the present invention involves a removable armrest for installation along the upper edge of doors of vehicles having a removable window, wherein the vehicle doors have a longitudinal upper edge that has engaging holes. The armrest has a longitudinal armrest portion configured to extend along the at least a portion of the upper edge of the door. The longitudinal armrest portion has a longitudinal base member which has a bottom surface and a top surface. The top surface has a channel defined along at least a portion of the length of the base member. The first armrest portion also has a substantially rigid frame member which has an upper portion and a lower portion. The substantially rigid frame member is proximate to and extends longitudinally along at least a portion of the channel of the base member, and at least a portion of the upper portion is positioned within and along the channel of the longitudinal base member. A padding extends longitudinally along the base member and has a bottom surface and a top surface. The bottom surface has a channel defined along at least a portion of the length of the padding. The channel receives at least a portion of the upper portion of the substantially rigid frame member. At least one substantially rigid armrest engaging pin extends from the bottom of the longitudinal armrest portion and is adapted to fit within at least one engaging hole along the upper edge of the vehicle door.

In one embodiment, the armrest has a plurality of substantially rigid armrest engaging pins which extend from the bottom of the longitudinal armrest portion and which are adapted to fit within a plurality of the engaging holes along the upper edge of the vehicle door.

Finally, the armrest is covered with a suitable covering material.

BRIEF DESCRIPTION OF THE DRAWINGS

FIG. 3 is a side view of the armrest of the present invention.

FIG. 4 is a top plan view of the armrest of the present invention.

FIG. 5 is a bottom plan view of the armrest of the present invention.

FIG. 6 is an end view taken from the end of the horizontal portion of the armrest of the present invention.

FIG. 7 is an end view taken from a forward or inclined end of the armrest of the present invention.

FIG. 8 is a cross-sectional view of the armrest taken along 8—8 of FIG. 3.

DETAILED DESCRIPTION OF THE PREFERRED EMBODIMENT

Figure 1:
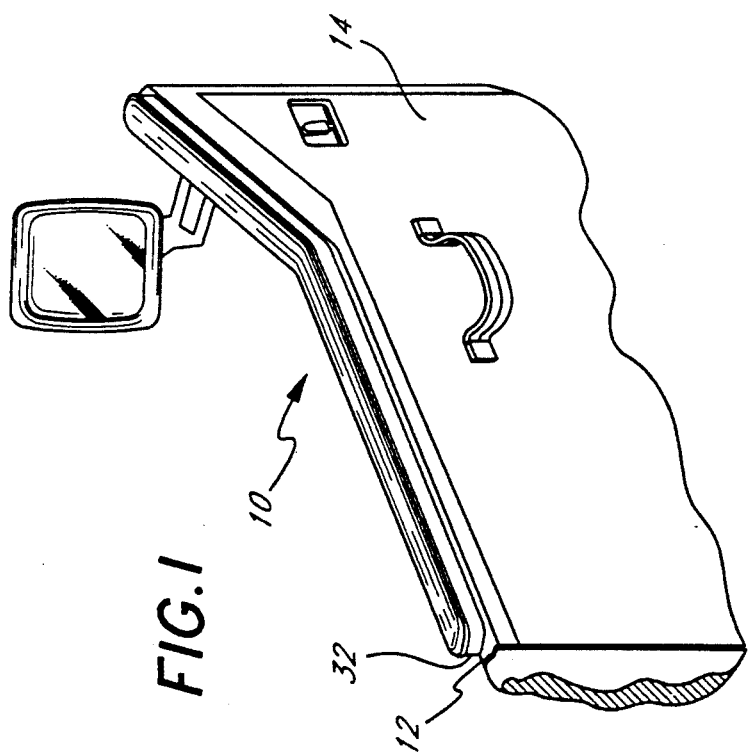
FIG. 1 is a perspective view of an embodiment of the armrest installed on the door of a Jeep Wrangler ®.

FIG. 1 depicts a perspective view of an armrest 10 installed along a track 12 at the upper edge of a door 14 of a vehicle such as a Jeep Wrangler ®. Vehicles such as the Jeep Wrangler ® have a removable top and removable windows. Removing the windows exposes an uncomfortable track 12 which is unsuited for an armrest. The unsuitability is intensified by exposure of the track 12 to the elephants, thereby resulting in extreme temperatures of the exposed track. The heat from the track 12 can even burn a person's skin. The armrest 10 of the present invention, as illustrated in FIG. 1, provides a cushion to the track 12 of the door 14 of a vehicle with a removable top. In addition, when the embodiment of the armrest 10 depicted in the figures is installed, the armrest 10 provides an aesthetically pleasing appearance to the track 12 of the door 14 because it covers substantially the entire length of the track.

Figure 2:
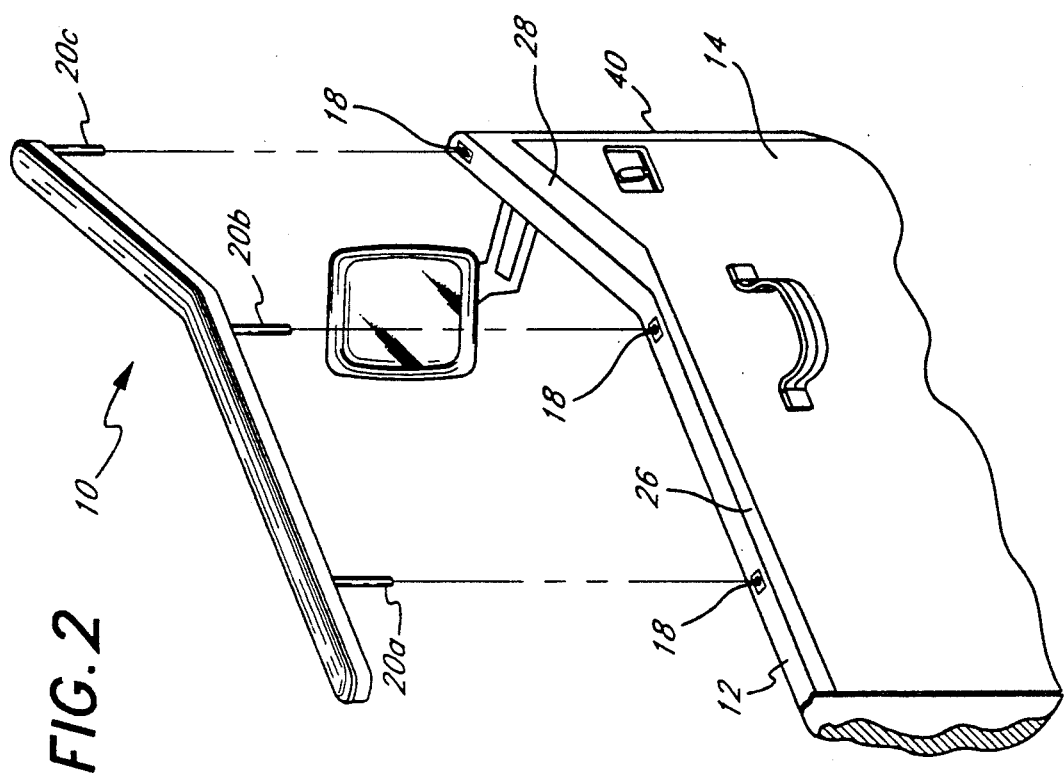
FIG. 2 is an exploded perspective view of the armrest and the door of the Jeep Wrangler ®.

As illustrated in FIG. 2, the track 12 of the door 14 of the Jeep Wrangler ®has three engaging holes 18, used to position and hold a removable window piece in place on the door 14 of the vehicle. The three engaging holes 18 are located along the track 12.

The embodiment of the present invention adapted for use with a Jeep Wrangler ® has three substantially cylindrical rods 20a, 20b and 20c attached to the bottom of the armrest 18 in the door 14 of the Jeep Wrangler ®. Thereby, the rods 20a-20c hold the armrest 10 firmly in place. Advantageously, the rods 20a-20c are substantially rigid and made of metal or other materials of similar characteristics such as composites of sufficient strength and rigidity to hold the armrest in place.

FIG. 3 depicts a side view of the armrest of the present invention. As illustrated in FIG. 3, the armrest 10 comprises essentially two portions: a first horizontal portion 22 and an inclined portion 24. The horizontal portion 22 of the armrest 10 fits along a horizontal portion 26 of the door 14. The inclined portion 24 of the armrest 10 is inclined at an angle which substantially corresponds to an inclined portion 28 of the upper edge of the door 14.

In the present embodiment for the Jeep Wrangler ®, two of the rods 20a and 20b extend from the underside 23 of the horizontal portion 22 of the armrest 10. For the current Jeep Wrangler ®, the first rod 20a is located at approximately ¼ of the distance between a posterior end 32 on the horizontal portion 22 of the armrest 10 and an intersection 33 of the horizontal portion 22 with the inclined portion 24. The second rod 20b is located almost at the intersection 33 of horizontal portion 22 and the inclined portion 24 of the armrest. The third rod 20c is located nearly at a forward end 38 of the inclined portion 24 of the armrest 10 near a hinged area 40 (FIG. 2) of the door 14.

The top and bottom plan views of FIGS. 4 and 5, respectively, illustrate that although the armrest 10 has a substantially inclined portion 24 and a horizontal portion 22, that the entire armrest 10 is substantially linear when viewed from the top or bottom. In addition, the rods 20a-20c that extend from the bottom of the armrest 10 are positioned substantially in line along the armrest as well.

FIG. 6 depicts an end view of the armrest 10 taken from the posterior end 32 of the armrest. Similarly, FIG. 7 depicts an end view of the armrest 10 taken from the forward end 38.

As illustrated in the cross-sectional view of FIG. 8, which is taken along 8—8 through the first rod 20a, each of the rods 20a-20c are attached to or integral with an internal substantially rigid plate 42 in the armrest 10. In one embodiment, the rods 20a-20c are mounted within the plate 42. In one embodiment, plate 42 comprises a strip of metal that is bent at the intersection 33 (FIG. 3) to conform to the shape of the upper edge of the door 14. The plate 42 provides a substantially rigid member to which the rods 20a-20c are mounted to fixedly attach the rods to the armrest a substantially resilient base member 44 is positioned adjacent the plate 42. The substantially resilient base member is advantageously made of wood, plastic, fiberglass, composite or other material with similar characteristics to which a fabric for vinyl covering can be easily attached. Advantageously, the base member further has the property of being somewhat less rigid than the plate 42 such that it does not cause extensive scratches or damage to the surface of the track of the door 14.

Advantageously, the base 44 has a channel adapted to at least partially receive the plate 42. Advantageously, the channel comprises a bottom surface 43 and side surfaces 45. In present embodiment, the plate 42 can be positioned partially or significantly within the channel for additional stability between the plate 42 and the base 44.

The base 44 provides a variety of advantageous functions. For instance, a covering 46 which covers the armrest is attached to the underside 47 of the base 44. The covering 46 provides a durable covering for the armrest 10, and it is easily stapled or otherwise attached or bonded to the base 44. The base 44 is also less rigid than the plate 42. Therefore, when installed along the track 12, it does not seriously scratch or otherwise damage the surface of the track 12 of the door 14. Additionally, the base 44 provides additional stability and durability to the armrest 10 because the rods 20a-20c extend from the plate 42 through the base 44. In one embodiment, the rods extend from the plate 42 through the base 44, a distance less than or equal to the depth of the engaging holes. Further, the use of the plate 42 in conjunction with the base 44 provides the strength of the substantially rigid plate 42 with the advantages listed of the more resilient base 44.

To provide a cushion, a padding 48 is placed over the plate 42, and, in the present embodiment, is approximately 1-2 inches thick. Advantageously, the padding 48 is made of a material such as polyurethane foam or other types of conventional padding. The thickness of the foam 48 is designed to cushion the user's arm; but it is not so thick that when pressure is applied, it would bend to one side or the other or elevate the armrest to a position which could be uncomfortable for the user.

In one embodiment, the padding 48 has a channel 50 configured along a lower surface 52. The channel 50 advantageously is adapted to receive at least a portion of the plate 42 so as to partially encompass or surround an upper portion of the plate 42. This channel 50 assists in preventing the padding 48 from slipping transversely across the plate 42 at an interface between the plate 42 and the foam padding 48. Similarly, at the ends of the plate 42, the channel walls extend to cover a portion of there ends of the plate 42. This assists in minimizing longitudinal slippage of the foam with respect to the plate 42, and also assures that the ends of the plate 42 do not protrude from the end of the foam padding 48 so as to make an uncomfortable armrest at either end.

Advantageously, the padding 48 may be bonded to the plate 42 at an interface between the plate 42 and the channel 50 of the padding 48. Similarly, the padding 48 and the base member 44 may be bonded at interfaces 52 between the base member 44 and the padding 48 along either side of the inner plate 42, as seen in FIG. 8. In one embodiment, as depicted in FIG. 8, the padding may also have radial curves to form rounded edges 54 extending from each side of the rounded edges 54 enhance the comfort and appearance of the armrest 10.

The covering 46 covers the padding 48, to provide a smooth surface to rest one's arm upon. The covering 46 is advantageously constructed from a vinyl material or a materials of similar characteristics such is leather or upholstery fabrics. In addition, the vinyl 46 is a durable material which protects the foam padding 48 from excessive wear and tear and exposure to the elements.

In the embodiment depicted in FIG. 8, the covering 46 extends also to cover the sides of the base 44 and extends to cover a portion of the bottom surface 47 of the base member 44. The covering is then attached at the under surface 47 of the base member 44 so that the attachment is not apparent when the armrest is installed in the track of the door 14.

To install the armrest 10, the rods 20 the guided into the corresponding engaging holes 18 on the door 14 of the vehicle, as seen in FIG. 2. In one embodiment, the rods 20 extend from the base member 44 far enough to enable the rods 20 to extend nearly to the bottom of the engaging hole 18 (nearly 3 inches in a Jeep Wrangler ®), and thereby anchor the armrest 10 in place.

Accordingly, the present invention provides a comfortable, aesthetically pleasing, and durable armrest configured for use with removable window automobiles such as the Jeep Wrangler ®, which typically do not have a window slot in the door.

Although the present invention has been described with respect to a Jeep Wrangler ®, other automobiles of similar type are also possible. Therefore, the present invention may be embodied in other specific forms without departing from its spirit or essential characteristics. The described embodiments merely illustrate and do not restrict the scope of the present invention. The scope of the invention is, therefore, indicated by the appended claims rather than the foregoing description. All changes which came within the meaning and range of equivalency of the claims are to be embraced within their scope.

I claim:

1. A removable armrest for use along the upper edge of doors of vehicles having a removable top and having engaging holes along the upper edge of the door, said armrest comprising:
   a first substantially horizontal portion;
   a second upwardly inclined portion extending longitudinally from said first horizontal portion; and
   a plurality of substantially rigid armrest engaging pins extending from a bottom side of the armrest, said engaging pins spaced to fit within the engaging holes along the upper edge of the vehicle door.

2. A removable armrest for installation along the upper edge of doors of vehicles having a removable window, the vehicle doors having engaging holes along the upper edge of the door which accept the engaging pins of the removable window, said armrest comprising:
   a substantially rigid frame member having a top surface and a bottom surface, said frame member further having a substantially horizontal portion and a second upwardly inclined portion longitudinally extending from said first horizontal portion;
   a base member proximate to and extending longitudinally along said substantially rigid frame member, said base member conforming to the first substantially horizontal portion and said second upwardly inclined portion;
   a plurality of substantially rigid armrest engaging pins mounted to and extending from said bottom surface and further extending through said base member, said engaging pins adapted and positioned to fit within the engaging holes along the upper edge of the vehicle door, so as to engage in a similar manner as the engaging pins of the removable window;
   a cushion portion extending longitudinally along at least a portion of the top surface of said substantially rigid frame member; and
   a durable covering encompassing at least a portion of said cushion portion and attached to said base member.

3. A removable armrest for installation along the upper edge of doors of vehicles, the upper edge of the door having a substantially horizontal door portion and an inclined door portion, the upper edge of the doors having engaging holes, said armrest comprising:
   a first substantially horizontal armrest portion dimensioned to extend along the substantially horizontal door portion, said first substantially horizontal armrest portion having a top and a bottom;
   a second upwardly inclined armrest portion extending longitudinally from said first substantially horizontal armrest portion and dimensioned to extend along the inclined door portion, said second upwardly inclined armrest portion having a top and a bottom;
   a cushion member attached along at least a portion of the top of the first and second armrest portions;
   a plurality of substantially cylindrical and substantially rigid armrest engaging pins fixed to the first substantially horizontal armrest portion, said engaging pins extending from the bottom of said first substantially horizontal armrest portion and positioned along the armrest to fit within the engaging holes along the upper edge of the vehicle door; and
   at least one substantially cylindrical and substantially rigid armrest engaging pin extending from the 4. A removable armrest for installation along the upper edge of doors of vehicles having a first substantially horizontal door portion and a second inclined door portion, the upper edge of the doors having engaging holes, said armrest comprising:
   a first substantially horizontal armrest portion configured to extend along the first horizontal door portion, said first armrest portion having a top and a bottom;
   a second upwardly inclined armrest portion extending longitudinally from said first substantially horizontal armrest portion and dimensioned to extend along the second inclined door portion, said second upwardly inclined armrest portion having a top and a bottom;
   a plurality of substantially cylindrical and substantially rigid armrest engaging pins fixed to the first substantially horizontal armrest portion, said engaging pins extending from the bottom of said first substantially horizontal armrest portion and spaced to fit within the engaging holes along the first substantially horizontal door portion of the upper edge of the vehicle door; and
   at least one substantially cylindrical and substantially rigid armrest engaging pin extending from the bottom of said second upwardly inclined armrest portion.

5. The armrest of claim 4, further comprising a cushion member attached along at least a portion of the top of the first armrest portion.

6. The armrest of claim 4, further comprising a cushion member attached along at least a portion of the top of the first and second armrest portions.

7. A removable armrest for installation along the upper edge of doors of vehicles having a first substantially horizontal portion and a second inclined portion, the upper edge of the doors having engaging holes, said armrest comprising:
   a first substantially horizontal armrest portion configured to extend along the first horizontal portion of the door, said first armrest portion having a top and a bottom;
   a second upwardly inclined armrest portion extending longitudinally from said first substantially horizontal armrest portion and dimensioned to extend along the second inclined portion of the door, said second upwardly inclined armrest portion having a top and a bottom;
   at least one substantially rigid armrest engaging pin extending from the bottom of said fist substantially horizontal armrest portion and positioned to fit within one of the engaging holes along the first substantially horizontal portion of the upper edge of the vehicle door; and
   at least one substantially rigid armrest engaging pin extending from the bottom of said second upwardly inclined armrest portion.

8. The armrest of claim 7, further comprising a plurality of substantially rigid armrest engaging pins extending from the bottom of said first armrest portion and adapted to fit within the engaging holes along the upper edge of the vehicle door.

9. The armrest of claim 7, further comprising a cushion member attached along at least a portion of the top of the first armrest portion.

10. The armrest of claim 7, further comprising a cushion member attached along at least a portion of the top of the first and second armrest portions.

11. A removable armrest for installation along the upper edge of doors of vehicles having a removable window, the vehicle doors having a first substantially horizontal portion and a second inclined portion, the upper edge of the doors having engaging holes, said armrest comprising:
- a substantially horizontal armrest portion configured to extend along the first horizontal portion of the door, said first armrest portion having a top and a bottom;
- at least one substantially rigid armrest engaging pin extending from the bottom of said substantially horizontal armrest portion and positioned to fit within at least one engaging hole along the upper edge of the vehicle door; and
- at least one substantially rigid armrest engaging pin extending from the bottom of said second upwardly inclined armrest portion.

12. The armrest of claim 11, further comprising a plurality of substantially cylindrical armrest engaging pins extending from the bottom of said first armrest portion and adapted to fit within a plurality of the engaging holes along the upper edge of the vehicle door.

13. The armrest of claim 12, further comprising a upwardly inclined armrest portion extending from said first substantially horizontal inclined portion of the door, said second armrest portion having a top and a bottom;

14. The armrest of claim 13, further comprising a cushion member attached along at least a portion of the top of the first and second armrest portions.

15. The armrest of claim 11, further comprising a cushion member attached along at least a portion of the top of the first armrest portion.

16. A removable armrest for installation along the upper edge of doors of vehicles having a removable top, the vehicle doors having engaging holes which accept the engaging pins of the removable top, said armrest comprising:
- a substantially rigid frame member having a top and a bottom surface, said frame member further having a first substantially horizontal portion and a second upwardly inclined portion extending longitudinally from said first horizontal portion;
- a substantially resilient base member proximate to and extending longitudinally along said substantially rigid frame member, said base member conforming to the first substantially horizontal portion and said second upwardly inclined portion;
- a plurality of substantially rigid armrest engaging pins extending away from said bottom surface and further extending through said substantially resilient base member, said engaging pins adapted and positioned to fit within the corresponding engaging holes along the upper edge of the vehicle door, so as to engage in a similar manner as the engaging pins of the removable window, said engaging pins extending through said substantially resilient base member;
- a cushion portion extending longitudinally along said substantially rigid frame member; and
- a durable covering over said cushion portion and attached to said base member.

17. The removable armrest of claim 16, wherein the engaging pins are integral with said substantially rigid frame member.

18. The removable armrest of claim 16, wherein the engaging pins are mounted along said substantially rigid frame member.

19. The removable armrest of claim 16, wherein the engaging pins are mounted within and extend away from said substantially rigid frame member.

20. A removable armrest for installation along the upper edge of doors of vehicles having a removable window, the vehicle doors having longitudinal upper edges, the upper edges of the doors having engaging holes, said armrest comprising:
- a substantially longitudinal armrest portion configured to extend along at least a portion of the door, said longitudinal armrest portion having a top and a bottom, said substantially longitudinal armrest portion comprising:
- a longitudinal base member having a bottom surface and a top surface, said base member having a channel defined along the top surface and extending along at least a portion of the length of the base member;
- a substantially rigid frame member having an upper portion and a lower portion, said substantially rigid frame member proximate to and extending longitudinally along at least a portion of the channel of said base member, wherein at least a portion of the upper portion is positioned within and along the channel of the longitudinal base member;
- a padding member extending longitudinally along said base member and having a bottom surface and a top surface, the bottom surface having a channel defined along at least a portion of the length of the padding member, said channel receiving at least a portion of the upper portion of said substantially rigid frame member; and
- at least one substantially rigid armrest engaging pin extending from the bottom of said longitudinal armrest portion, said engaging pin adapted and positioned to fit within at least one engaging hole along the upper edge of the vehicle door.

21. The armrest of claim 20, further comprising a plurality of substantially rigid armrest engaging pins extending from the bottom of said longitudinal armrest portion and adapted to fit within a plurality of the engaging holes along the upper edge of the vehicle door.

22. The armrest of claim 20, further comprising a suitable covering which encompasses at least a portion of the padding member and the base member.

* * * * *